US011560739B2

(12) United States Patent
Och et al.

(10) Patent No.: US 11,560,739 B2
(45) Date of Patent: Jan. 24, 2023

(54) DOOR HANDLE ARRANGEMENT FOR A VEHICLE

(71) Applicant: ILLINOIS TOOL WORKS INC., Glenview, IL (US)

(72) Inventors: Roland Och, Rottendorf (DE); Zsolt Wilke, Bad Mergentheim (DE); Andreas Rudolf, Würzburg (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 521 days.

(21) Appl. No.: 16/377,399

(22) Filed: Apr. 8, 2019

(65) Prior Publication Data

US 2019/0309547 A1    Oct. 10, 2019

(30) Foreign Application Priority Data

Apr. 9, 2018  (DE) .......................... 102018108307.6

(51) Int. Cl.
  *E05B 79/06*   (2014.01)
  *E05B 85/10*   (2014.01)
  *B60J 5/04*    (2006.01)

(52) U.S. Cl.
  CPC ............ *E05B 79/06* (2013.01); *E05B 85/103* (2013.01); *E05B 85/107* (2013.01); *B60J 5/04* (2013.01); *E05Y 2900/531* (2013.01); *Y10S 292/31* (2013.01); *Y10T 292/57* (2015.04)

(58) Field of Classification Search
  CPC .... Y10S 292/31; E05B 85/103; E05B 85/107; E05B 5/00; E05B 5/003; E05B 79/06; Y10T 292/57
  See application file for complete search history.

(56) References Cited

U.S. PATENT DOCUMENTS

| | | | |
|---|---|---|---|
| 6,401,302 B1* | 6/2002 | Josserand | E05B 79/06 16/444 |
| 9,183,999 B2* | 11/2015 | Satou | H01H 9/04 |
| 10,280,658 B2* | 5/2019 | Halliwell | E05B 85/107 |
| 10,533,353 B2* | 1/2020 | Smart | E05B 81/76 |
| 10,926,692 B2* | 2/2021 | Rhein | E05B 17/10 |

(Continued)

FOREIGN PATENT DOCUMENTS

| | | |
|---|---|---|
| CN | 103703202 A | 4/2014 |
| CN | 105019744 A | 11/2015 |

(Continued)

*Primary Examiner* — Carlos Lugo
(74) *Attorney, Agent, or Firm* — Thompson Hine LLP

(57) ABSTRACT

A door handle arrangement for a vehicle, includes a housing and a handle lever which is mounted on the housing such that it can be moved between a rest position and an actuating position for unlocking and/or opening a vehicle door, it being possible for the housing to be oriented on a vehicle body outer part which forms a part of the outer surface of a vehicle body and has a handle cut-out for the handle lever, first positioning projections being provided on the housing, which first positioning projections are configured to bear against an angled-over edge of the vehicle body outer part, which angled-over edge delimits the handle cut-out of the vehicle body outer part at least in regions, and, as a result, to position the handle lever with the housing in at least one spatial direction in relation to the handle cut-out.

12 Claims, 4 Drawing Sheets

(56) References Cited

U.S. PATENT DOCUMENTS

| | | | |
|---|---|---|---|
| 10,954,702 B2* | 3/2021 | Couto Maquieira | ... E05B 81/16 |
| 2014/0265372 A1* | 9/2014 | Smart | ...................... E05B 5/003 |
| | | | 292/336.3 |
| 2016/0010368 A1* | 1/2016 | Tanoguchi | ............. B60J 5/0493 |
| | | | 16/412 |
| 2018/0172043 A1 | 6/2018 | Bräutigam | |
| 2019/0301209 A1* | 10/2019 | Low | ...................... F16B 5/0628 |

FOREIGN PATENT DOCUMENTS

| | | | | |
|---|---|---|---|---|
| CN | 105298261 | A | 2/2016 | |
| CN | 205349138 | U | 6/2016 | |
| CN | 206190064 | U | 5/2017 | |
| CN | 108625670 | A * | 10/2018 | |
| CN | 113216768 | A * | 8/2021 | |
| DE | 3712376 | C * | 8/1988 | |
| DE | 202014105691 | U1 * | 3/2015 | ............. E05B 85/12 |
| DE | 102015103491 | | 8/2016 | |
| DE | 102016216384 | B3 * | 7/2017 | ............. B60K 15/05 |
| FR | 3034802 | A1 * | 10/2016 | ............. E05B 85/103 |
| JP | 2000282735 | A | 10/2000 | |
| WO | WO-02092947 | A1 * | 11/2002 | ............. E05B 79/06 |

* cited by examiner

DOOR HANDLE ARRANGEMENT FOR A VEHICLE

TECHNICAL FIELD

The invention relates to a door handle arrangement for a vehicle, comprising a housing and a handle lever which is mounted on the housing such that it can be moved between a rest position and an actuating position for unlocking and/or opening a vehicle door, it being possible for the housing to be oriented on a vehicle body outer part which forms a part of the outer surface of a vehicle body and has a handle cut-out for the handle lever.

BACKGROUND

Door handle arrangements are known, in which the handle lever terminates flush with the surrounding vehicle body outer side. For actuation purposes, the handle lever can be pivoted about a fixed pivot axis. As a result, a defined opening and closing movement of the handle lever is fixed. In practice, unavoidable dimensional and assembly tolerances occur between individual components of the door handle arrangement and/or between the door handle arrangement and vehicle body parts which are to be connected to it. For example, vehicle body parts and door handle arrangements which are to be fastened to them are often produced and assembled by different companies. In order to nevertheless ensure that the handle lever can be actuated reliably during operation without the risk of coming into contact with a vehicle body cut-out or hard housing sections, a sufficiently large gap has to be provided between the handle lever and the edge of a vehicle body cut-out which is provided for the handle lever. Large gap sizes are as a rule undesired for visual reasons, however.

Moreover, in particular, flush door handle arrangements are currently assembled by way of a template which is inserted from the outer side of the vehicle body into a gap between the vehicle body part and the handle lever. This type of assembly is time-consuming. Moreover, the accuracy is insufficient not least because of a certain elasticity of the handle lever. After removal of the template which is provided only for the assembly, the handle lever as a rule moves back into a different position, with the result that it no longer assumes the position which is defined by way of the template.

SUMMARY

Proceeding from the described prior art, the invention is based on the object of providing a door handle arrangement of the type mentioned at the outset which makes small gap sizes possible in a manner which is simple to produce and assemble.

For a door handle arrangement of the type mentioned at the outset, the invention achieves the object by virtue of the fact that first positioning projections are provided on the housing, which first positioning projections are configured to bear against an angled-over edge of the vehicle body outer part, which angled-over edge delimits the handle cut-out of the vehicle body outer part at least in regions, and, as a result, to position the handle lever with the housing in at least one spatial direction in relation to the handle cut-out.

The housing of the door handle arrangement according to the invention is configured to be oriented, in particular arranged and possibly fastened, on a vehicle body outer part of a vehicle body. The vehicle body outer part forms a part of the visible outer surface of the vehicle body. The vehicle can be, for example, a passenger car or a truck. The vehicle outer part can consist of a metal, for example steel or aluminum. It can be a vehicle body panel. The vehicle body outer part can also consist of plastic, however, for example a carbon fiber reinforced plastic. This fundamentally applies to the entire vehicle body. The housing of the door handle arrangement can consist, for example, of a plastic. This also applies to the handle lever and the first positioning projections.

The vehicle body outer part has a handle cut-out, into which, in the case of a housing which is oriented on the vehicle body outer part, the handle lever is inserted in such a way that the handle lever is accessible from the outside in the mounted state. The handle lever is mounted movably on the housing firstly for unlocking and/or opening the vehicle door. In particular, the handle lever is mounted such that it can be moved between a rest position which is situated in the housing and corresponds to the closed state of the door handle arrangement and vehicle door and an actuating position, in which it is moved out of the housing. For example, the handle lever can be mounted pivotably on the housing to this end. In that state of the door handle arrangement, in which it is installed in a vehicle, said pivot axis can run, for example, in the vertical direction. The unlocking of the vehicle door can take place in a purely electric manner or in a purely mechanical manner or else in an electric and (redundant) mechanical manner. If the unlocking takes place exclusively in an electric manner, the pivoting of the handle lever out of the rest position into the actuating position serves only for pulling open the door which is already unlocked and possibly for actuating the electric unlocking. Here, the door can also be pre-opened in an electric manner over a small opening travel.

The handle cut-out of the vehicle body outer part is as a rule delimited by way of an angled-over edge which is, for example, approximately at a right angle. In particular, the vehicle body outer part is as a rule bent over inward in the region of the handle cut-out and thus forms an angled-over edge. The angled-over edge can run completely around the handle cut-out. According to the invention, said angled-over edge is used directly in a particularly simple way to position the handle lever in relation to the vehicle body outer part, in particular the handle cut-out. To this end, first positioning projections are provided on the housing, which first positioning projections bear against the angled-over edge of the handle cut-out in the state, in which they are oriented on the vehicle body outer part, and position the handle lever with the housing in at least one spatial direction in relation to the handle cut-out as a result. In this context, positioning means that the position is defined and, in particular, is fixed conclusively. Here, the handle lever is fixed in the respective spatial direction by way of the first positioning projections. A direct orientation of the housing on the handle cut-out takes place in this way, independently of any component or assembly tolerances. In addition to simple production and assembly of the door handle arrangement, precise positioning of the handle lever in the handle cut-out with small gap sizes between the handle lever and the handle cut-out is achieved. This applies, in particular, to handle levers which terminate flush with the surrounding outer surface of the vehicle body in the rest position. Here, in particular, no prestressing means, such as a prestressing spring, are required or provided which prestress the handle lever against the handle cut-out. Rather, the handle lever is positioned in relation to the handle cut-out solely by way of the first positioning projections.

In the case of a vehicle, such as a passenger car, three axes are as a rule defined in relation to the vehicle. The X-axis corresponds to the horizontal longitudinal direction of the vehicle, the Y-axis corresponds to the horizontal transverse axis of the vehicle which lies perpendicularly with respect to the X-axis, and the Z-axis corresponds to the vertical axis. In this way, an orthogonal three-dimensional coordinate system is defined by way of the X-axis, the Y-axis and the Z-axis. Apart from its movability between the rest position and the actuating position, the handle lever can be mounted on the housing in a play-free and positionally precise manner, in particular in the X-direction and the Z-direction. In this respect, no play is necessary for the handle lever in the assembled state as a result of the first positioning projections and the direct orientation according to the invention on the angled-over edge of the vehicle body outer part. A particularly high quality feel is produced. At the same time, contact or jamming of the handle lever on the handle cut-out during its movement between the actuating position and the rest position is prevented in a reliable way.

The first positioning projections can be configured, in particular, to position the handle lever with the housing in all spatial directions in relation to the handle cut-out by way of bearing against the angled-over edge of the vehicle body outer part. In the abovementioned embodiment, defined positioning and fixing of the handle lever in all of the abovementioned spatial directions takes place by way of the interaction of the first positioning projections with the angled-over edge of the handle cut-out. In accordance with what is known as the 3-2-1 rule, it is sufficient for a clearly defined fixing of the position in said spatial directions if one positioning projection is provided for positioning in a first spatial direction, for example the X-direction, two positioning projections are provided for positioning in a second spatial direction, for example the Z-direction, and three positioning projections are provided for positioning in the third spatial direction, for example the Y-direction. It goes without saying, however, that other numbers of positioning projections for the spatial directions are also conceivable.

The first positioning projections can be connected to the housing by way of a latching connection. The positioning projections which are produced as separate components in this embodiment can consist of a different material than the housing. For example, they can consist of a softer material than the housing, with the result that noise and paint damage can be avoided reliably. It would also be conceivable, however, that the first positioning projections are connected in one piece to the housing. Particularly simple production and assembly take place as a result.

In accordance with a further embodiment, the first positioning projections can be arranged in each case at a spacing from the handle lever, and, in order to position the handle lever with the housing, the angled-over edge can be received in the space which is formed in each case by way of the spacing. Here, the spacing can correspond substantially to the thickness of the angled-over edge or can be slightly greater than the thickness of the angled-over edge. The angled-over edge can therefore be held firmly between the first positioning projections and the handle lever in the rest position of the handle lever. There can be a slight force fit here.

In accordance with a further embodiment, the handle lever can have two longitudinal sides and two transverse sides, and the first positioning projections can be arranged on the housing adjacently with respect to the two longitudinal sides and with respect to the two transverse sides of the handle lever. In the case of a rectangular handle lever, for example, the longitudinal sides are the two longer sides and the transverse sides are the two shorter sides. It goes without saying here that the longitudinal sides and transverse sides do not have to run in each case along a straight line. Rather, they can also have a course which is curved (multiple times). The longitudinal sides also do not have to run parallel to one another. The transverse sides also do not have to run parallel to one another. In the case of the abovementioned embodiment, first positioning projections are arranged in each case adjacently with respect to the two longitudinal sides and with respect to the two transverse sides. For example, some or all of the first positioning projections can be arranged so as to lie opposite one another in pairs. Therefore, first positioning projections are situated above and below the handle lever and on the two opposite sides. As a result, particularly reliable positioning is achieved. In each case a plurality of first positioning projections, for example in each case two first positioning projections, can be provided, for example, on the longitudinal sides in a manner which is spaced apart in the longitudinal direction, depending on the length of the handle lever. In each case a plurality of first positioning projections can of course also fundamentally be provided adjacently with respect to the transverse sides of the handle lever.

Furthermore, the door handle arrangement according to the invention can comprise the vehicle body outer part. This relates, in particular, to the state of the housing and therefore of the handle lever, in which they are oriented, in particular arranged and/or fastened, on the vehicle body outer part. Furthermore, the handle lever can terminate substantially flush with that outer surface of the vehicle body which surrounds the handle cut-out in the rest position. This results in a particularly pleasing design. A defined recessed length or projecting length of the handle lever in relation to that outer surface of the vehicle body which surrounds the handle cut-out would of course also be possible, however.

Furthermore, the door handle arrangement according to the invention can comprise a vehicle body inner part which is fastened to the vehicle body outer part, it being possible for the housing to be fastened to the vehicle body inner part, and the vehicle body inner part having a cut-out, through which the housing protrudes with the handle lever in the state, in which it is fastened to the vehicle body inner part. The vehicle body inner part can be capable of being fastened to the vehicle body outer part in fundamentally any desired way, for example by way of screwing, welding and/or adhesive bonding. The housing can be fastened to the vehicle body inner part by way of suitable fastening means, for example by way of screwing, latching or the like. The vehicle body inner part can also consist of a metal, such as steel or aluminum, or a plastic, for example a carbon fiber reinforced plastic. The vehicle body inner part has a cut-out, through which at least the handle lever with the first positioning projections can be guided. The housing is plugged from the inner side partially through the vehicle body inner part and can thus be positioned through the vehicle body inner part on the vehicle body outer part. In the case of said embodiment, the housing with the handle lever is fastened indirectly via the vehicle body inner part to the vehicle body outer part. The housing therefore does not itself have to have any fastening means for direct fastening to the vehicle body outer part. Rather, the housing is fastened to the vehicle body inner part, as described, via suitable fastening means, which vehicle body inner part is then in turn fastened to the vehicle body outer part in a suitable way, as described.

In accordance with a further embodiment in this regard, second positioning projections can be provided on the housing, which second positioning projections pre-position the housing in at least one spatial direction in relation to the vehicle body inner part on the cut-out of the vehicle body inner part in the state, in which said housing is fastened to the vehicle body inner part. Here, the housing and therefore the handle lever are oriented on the vehicle body inner part via the second positioning projections. To this end, the second positioning projections can bear at least partially against the cut-out of the vehicle body inner part or can be at a small spacing from the cut-out of the vehicle body inner part. In particular, the second positioning projections can bear from the inside against the edge of the cut-out in that state of the housing, in which it is fastened to the vehicle body inner part. The second positioning projections achieve a pre-orientation, with the result that the housing and therefore the handle lever are already pre-oriented satisfactorily on the handle cut-out for the subsequent positioning via the first positioning projections. The pre-orientation or pre-positioning on the vehicle body inner part therefore facilitates the arranging and positioning in relation to the folded-over edge of the handle cut-out. Only a precision orientation still has to take place. The second positioning projections can once again position the housing in all spatial directions in relation to the vehicle body inner part, as described above for the first positioning projections. The second positioning projections can once again be connected to the housing by way of a latching connection. They can then consist of a different material than the housing, for example. The second positioning projections can also once again be connected in one piece to the housing, however, for particularly simple production and assembly.

The cut-out of the vehicle body inner part can once again have two longitudinal sides and two transverse sides, and the second positioning projections can bear against the two longitudinal sides and against the two transverse sides of the cut-out of the vehicle body inner part in the state, in which they are fastened to the vehicle body inner part. Particularly reliable positioning once again takes place as a result. To this end, the second positioning projections bear from the inside against the two longitudinal sides and against the two transverse sides. A plurality of second positioning projections, for example in each case two second positioning projections, can once again bear against the two longitudinal sides depending on the longitudinal extent of the cut-out. In each case a plurality of second positioning projections can of course fundamentally also bear against the transverse sides. It goes without saying that the longitudinal sides and transverse sides of the cut-out once again do not have to run in each case along a straight line. Rather, they can have a course which is curved (multiple times). The longitudinal sides also do not have to run parallel to one another. The transverse sides likewise do not have to run parallel to one another.

In accordance with a further refinement, the housing can be capable of being fastened or can be fastened to the vehicle body inner part via a plurality of tolerance compensation elements. Tolerance compensation elements of this type are fastening elements which can compensate for positional tolerances in at least one spatial direction, for example in all spatial directions. One example of a tolerance compensation element which can compensate for positional tolerance, in particular, in the Y-direction is disclosed in DE 10 2015 103 491 A1. For example, play of a fastening bolt or the like can be provided in the X-direction and the Z-direction, in order also to ensure tolerance compensation in said spatial directions. Spring elements can also be provided which permit a tolerance in the X-direction and the Z-direction.

BRIEF DESCRIPTION OF THE DRAWINGS

One exemplary embodiment of the invention will be described in greater detail in the following text using figures, in which, diagrammatically.

Unless specified otherwise, identical designations denote identical objects in the figures.

DETAILED DESCRIPTION

Figure 1:
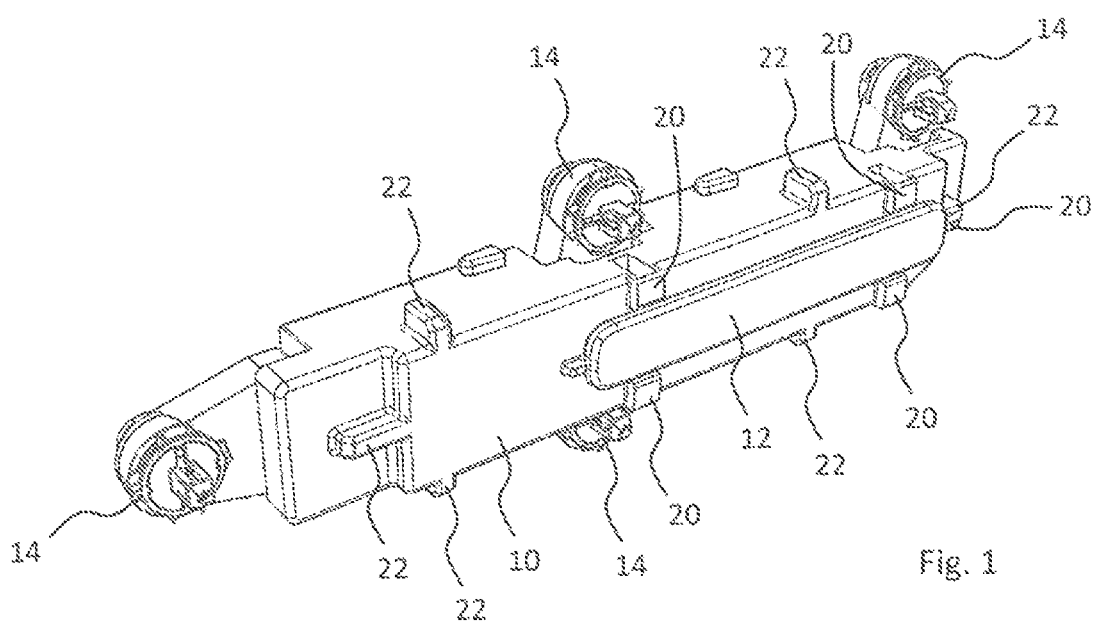
FIG. 1 shows a housing of a door handle arrangement according to the invention in a perspective front view.

FIG. 1 shows a housing 10 of a door handle arrangement according to the invention. In the example which is shown, an elongate handle lever 12 is mounted on the housing 10 such that it can be pivoted between the rest position which is shown in FIG. 1 and an actuating position. In the example which is shown, the handle lever 12 can be pivoted away from the housing 10 from the rest position which is shown in FIG. 1 about a pivot axis which is arranged in the region of the left hand end of the handle lever 12 in FIG. 1, for opening and/or unlocking a vehicle door of a vehicle, such as a passenger car or truck. This is known per se. Via four fastening elements 14 in the example which is shown, the housing 10 can be fastened to corresponding fastening seats 16 of a vehicle body inner part 18, for example can be screwed by way of fastening screws 40 (see FIG. 10). The fastening elements 14 can be tolerance compensation elements which can compensate for positional tolerances between the housing 10 and the vehicle body inner part 18 in at least one spatial direction.

In the example which is shown in FIG. 1, six first positioning projections 20 are arranged on the housing 10, for example, via a latching connection to said housing 10. The first positioning projections 20 are situated in each case with a small spacing directly adjacently with respect to the handle lever 12 which is situated in the rest position. In particular, in each case first positioning projections 20 are arranged on the two longitudinal sides and on the two transverse sides of the handle lever 12. In each case one first positioning projection 20 is arranged on the two transverse sides. In each case two first positioning projections 20 are arranged on the two longitudinal sides. Here, the first positioning projections 20 lie opposite one another in pairs. Moreover, in the example which is shown, six second positioning projections 22 are arranged on the housing 10, for example by way of a latching connection. The second positioning projections 22 also lie opposite one another in pairs.

Figure 2:
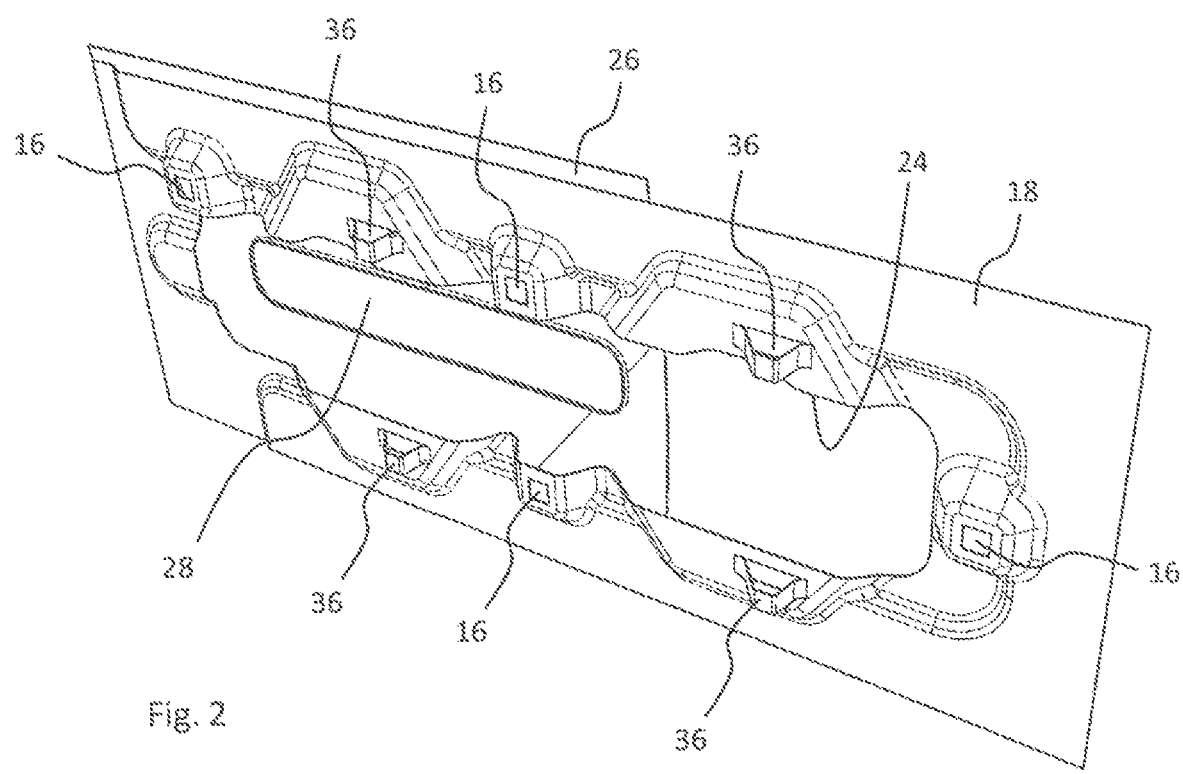
FIG. 2 shows a vehicle body outer part with a vehicle body inner part which is fastened to it in a perspective rear view.
Figure 3:
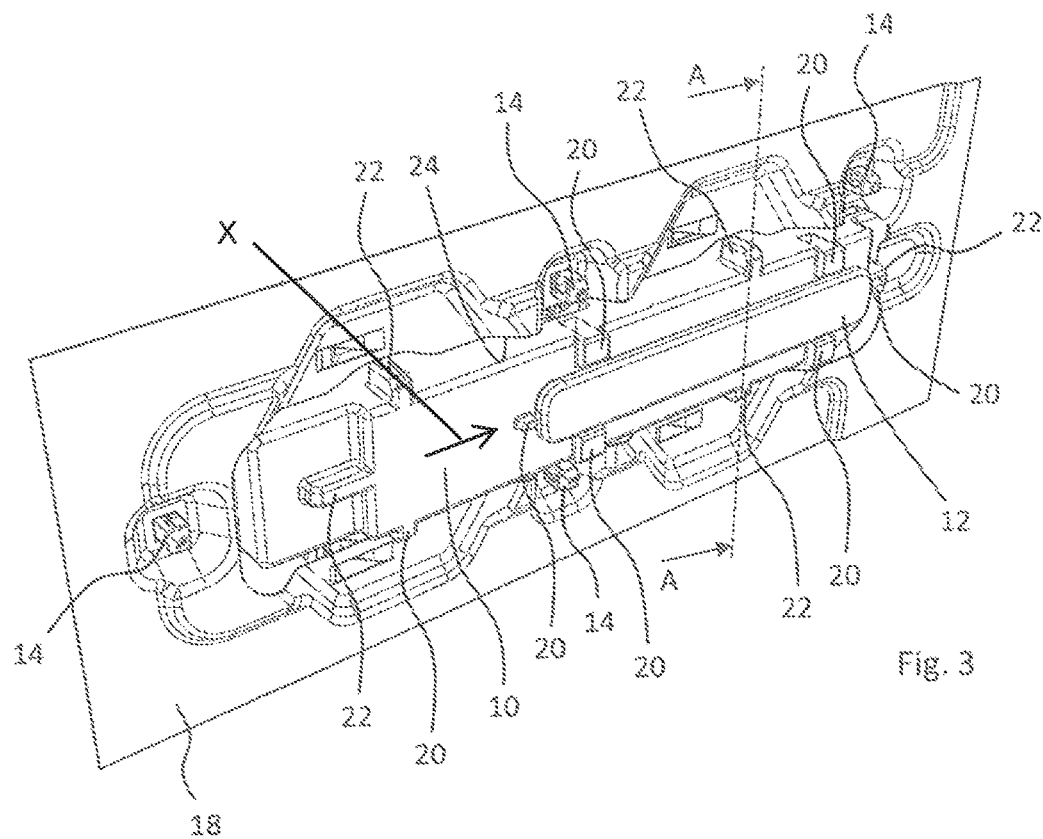
FIG. 3 shows the housing which is shown in FIG. 1 in the state, in which it is fastened to the vehicle body inner part which is shown in FIG. 2, in a perspective front view.
Figure 4:
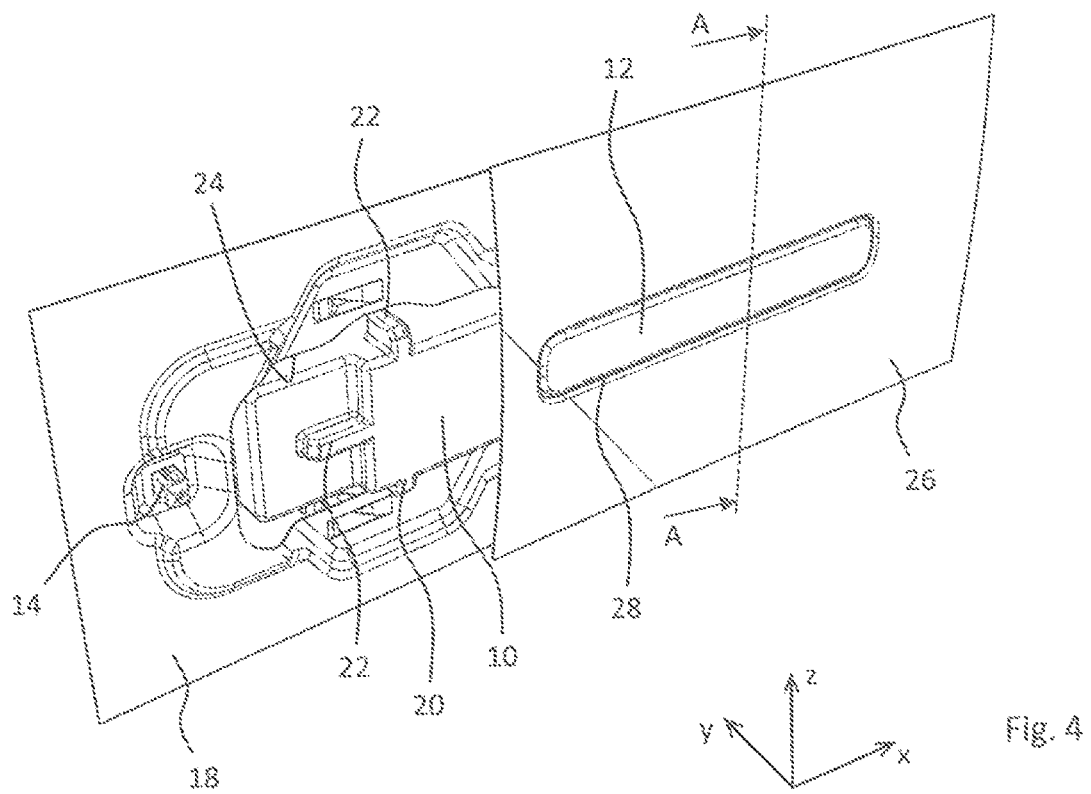
FIG. 4 shows the illustration from FIG. 3 with a vehicle body outer part which is fastened to the vehicle body inner part.
Figure 5:
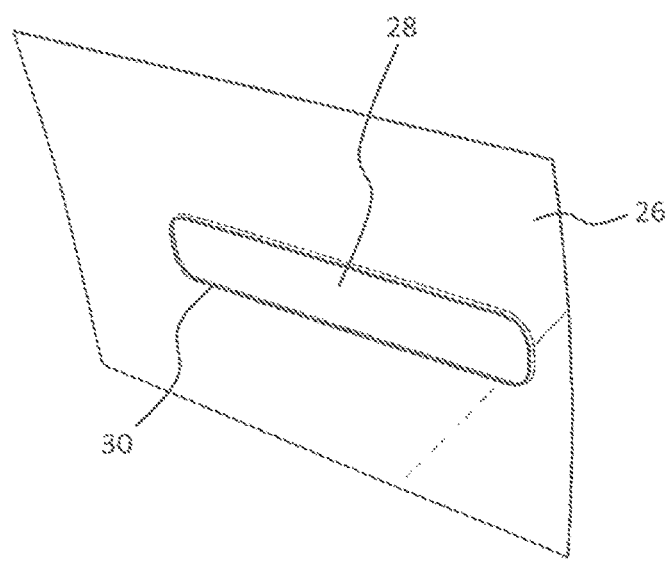
FIG. 5 shows the vehicle body outer part in a perspective rear view.
Figure 7:
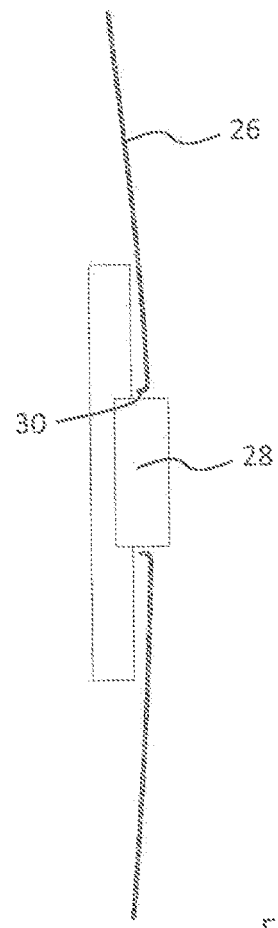
FIG. 7 shows the vehicle body outer part in the illustration according to FIG. 6.

The vehicle body inner part 18 has an elongate cut-out 24, through which the housing 10 can be plugged with the handle lever 12, as can be seen in FIG. 3. Here, the housing 10 is set onto the vehicle body inner part 18 from the rear side of the latter which can be seen in FIG. 2, and is fastened, for example latched and/or screwed, to the fastening receptacles 16 via the fastening elements 14. During the assembly, the vehicle body inner part 18 can previously have already been connected to a vehicle body outer part 26 which is shown in part in the figures. Said fastening can take place, for example, by way of screwing, welding or adhesive bonding. With its outer surface which can be seen, for example, in FIG. 4, the vehicle body outer part 26 forms a part of the outer surface of the vehicle body. The vehicle body outer part 26 has an elongate handle cut-out 28, in which the handle lever 12 is received with small gap sizes in the assembled state, as can be seen in FIG. 4, for example. As can be seen in the rear view of FIG. 5, in particular, the handle cut-out 28 of the vehicle body outer part 26 is delimited by way of an angled-over edge 30 which is, for example, at a right angle and has been produced by bending over of the vehicle body outer part 26 toward the inside. This can also be seen in FIG. 7.

Whereas the housing 10 including the handle lever 12 can consist, for example, of plastic, the vehicle body inner part 18 and the vehicle body outer part 26 can consist, for example, of a metal, such as steel or aluminum, or likewise plastic, such as a carbon fiber reinforced plastic.

Figure 6:
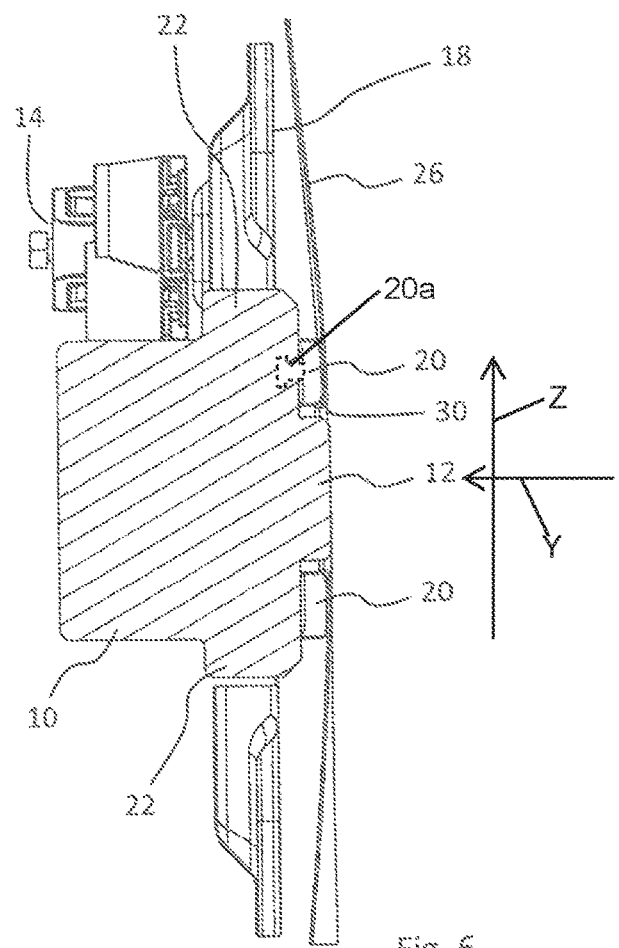
FIG. 6 shows a sectional view along the line A-A in FIG. 4, which line is also shown in FIG. 3 by way of illustration.

As can be seen in FIG. 3, in particular, the second positioning projections 22 are situated spaced apart slightly from the edge which delimits the cut-out 24 in the state, in which they have been inserted from the inside into the cut-out 24 of the vehicle body inner part 18. Positioning of the housing 10 and therefore of the handle lever 12 takes place, which handle lever 12 can be mounted on the housing 10 substantially without play, in particular in the X-direction and the Z-direction, in relation to the vehicle body inner part 18 apart from its movement between the rest position and the operating position. It is to be noted in this regard that, in the illustration of the drawing, the second positioning projection 22 which is on the far left in FIG. 3 does not bear against the inner edge of the cut-out 24 on account of the size of the cut-out. It goes without saying that said second positioning projection 22 might also bear against the inner edge of the cut-out 24. A first orientation of the housing 10 with the handle lever 12 takes place by way of the second positioning projections 22. As a result, the handle lever 12 is already oriented very satisfactorily onto the handle cut-out 28 of the vehicle body outer part 26. When the handle lever 12 is then inserted into the handle cut-out 28 during the insertion of the housing 10, the folded-over edge 30 of the vehicle body outer part 26 passes in each case between the outer edge of the handle lever 12 and the first positioning projections 20, as shown, in particular in FIG. 6, for the first positioning projections 20 which are arranged in the region of the right hand end of the handle lever 12 adjacently with respect to the upper and lower longitudinal side of the handle lever 12. In a corresponding way, the further first positioning projections 20 bear against the folded-over edge 30. In this way, the handle lever 12 with the housing 10 is positioned conclusively in relation to the handle cut-out 28, it being possible for small gap sizes to be realized between the handle lever 12 and the edge of the handle cut-out 28. In the example which is shown, positioning of the handle lever 12 in all three spatial directions X, Y and Z takes place by way of the first positioning projections 20. A corresponding coordinate system diagram is shown in FIG. 4 by way of illustration.

Figure 8:
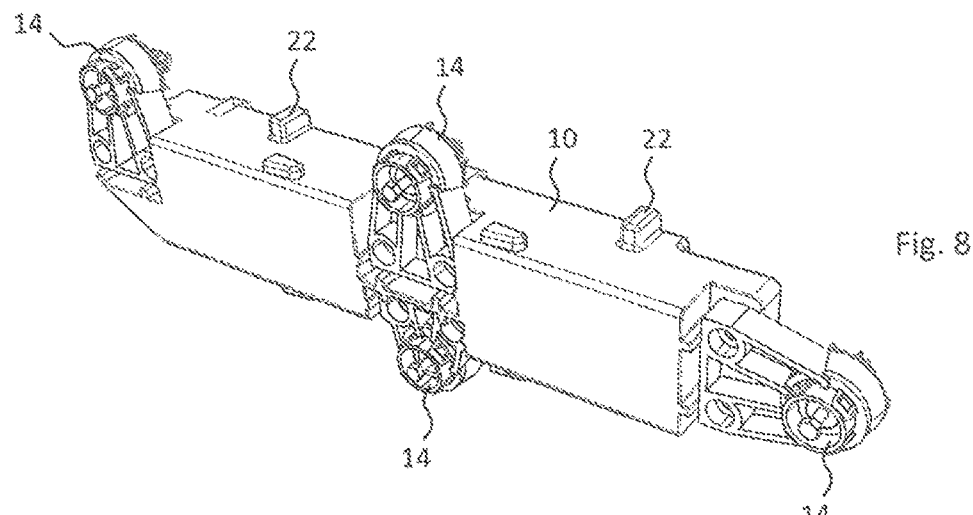
FIG. 8 shows the housing which is shown in FIG. 1, in a perspective rear view.
Figure 9:
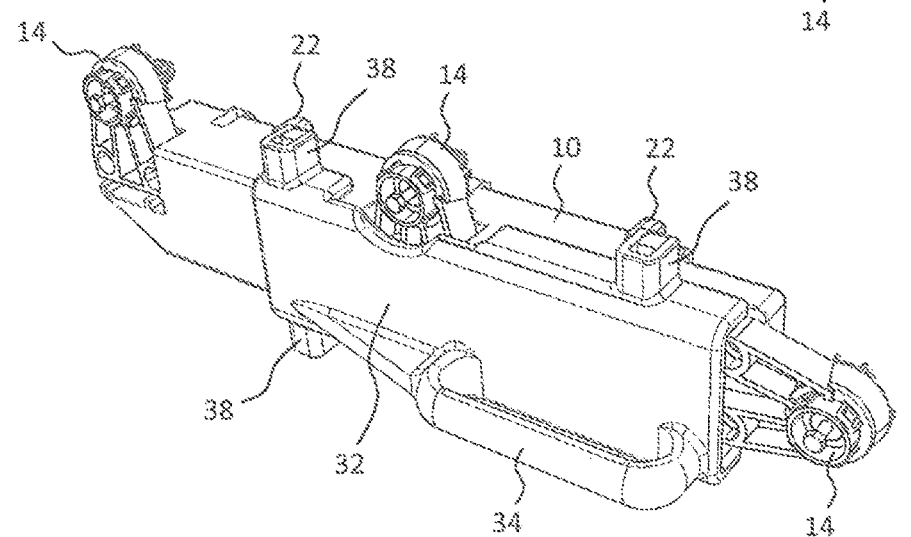
FIG. 9 shows the illustration from FIG. 8 with an assembly aid which is arranged on the housing.
Figure 10:
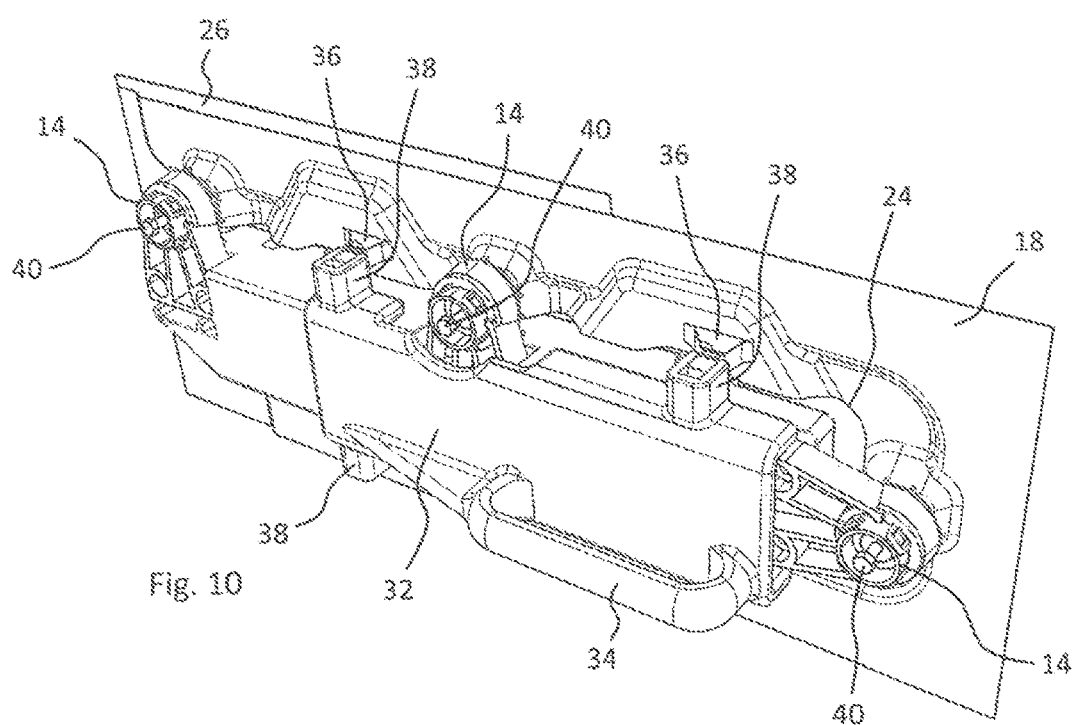
FIG. 10 shows the illustration from FIG. 9 in the state, in which said assembly aid is arranged on the vehicle body outer part and the vehicle body inner part.

An assembly aid 32 which can be used manually is to be described using FIGS. 8 to 10. The assembly aid 32 has a handle 34, by way of which it can be operated using one hand. As can be seen in FIGS. 8 and 9, the assembly aid 32 is attached to the housing 10 from the rear side. Here, for example, the assembly aid 32 can be held on the housing 10 with a slight clamping action. In this state, the housing 10 is attached onto the rear side of the vehicle body inner part 18 by means of the assembly aid 32. As can be seen in FIG. 2, for example, four inwardly protruding projections 36 which can be magnetic, for example, are situated on the rear side of the vehicle body inner part 18 in the example which is shown. Four corresponding magnets 38 are arranged on the assembly aid 32, which magnets 38 orient the assembly aid 32 and, with it, the housing 10 firstly in relation to the vehicle body inner part 18, and then secondly hold the latter in a preliminary manner on the vehicle body inner part 18 in the state which is shown in FIG. 10. The operator can then fasten the fastening elements 14 to the vehicle body inner part 18 without involving a further person, for example by screwing in the fastening screws 40 of the fastening elements 14. After the assembly, the assembly aid 32 can be removed from the housing 10 in a simple way. As long as a non-magnetic material, such as aluminum or plastic, is used for the vehicle body inner part, preliminary holding means would be conceivable for holding the assembly aid on the vehicle body inner part in a preliminary manner, for example holding claws which can be actuated via the assembly aid or the like.

Potential features of the invention include A-M below:

A. A door handle arrangement for a vehicle, comprising a housing (10) and a handle lever (12) which is mounted on the housing (10) such that it can be moved between a rest position and an actuating position for unlocking and/or opening a vehicle door, it being possible for the housing (10) to be oriented on a vehicle body outer side (26) which forms a part of the outer surface of a vehicle body and has a handle cut-out (28) for the handle lever (12), wherein first positioning projections (20) are provided on the housing (10), which first positioning projections (20) are configured to bear against an angled-over edge (30) of the vehicle body outer part (26), which angled-over edge (30) delimits the handle cut-out (28) of the vehicle body outer part (26) at least in regions, and, as a result, to position the handle lever (12) with the housing (10) in at least one spatial direction in relation to the handle cut-out (28). For example, the upper and lower projections (20) in FIG. 6 position the handle lever (12) with housing (10) in both spatial direction Z and spatial direction Y. The side located spatial projections (20) in FIG. 3 position the handle lever (12) with housing (10) in spatial direction X.

B. The door handle arrangement per A, wherein the first positioning projections (20) are configured to position the handle lever (12) with the housing (10) in all spatial directions in relation to the handle cut-out (28) by way of bearing against the angled-over edge (30) of the vehicle body outer part (26).

C. The door handle arrangement per A or B, wherein the first positioning projections (20) are connected to the housing (10) by way of a latching connection (e.g., connection 20a shown in dashed line form in FIG. 6).

D. The door handle arrangement per any one of A-C, wherein the first positioning projections (20) are arranged in each case at a spacing from the handle lever (12), and in that, in order to position the handle lever (12) with the housing (10), the angled-over edge (30) is received in the space which is formed in each case by way of the spacing.

E. The door handle arrangement per any one of A-D, wherein the handle lever (12) has two longitudinal sides and two transverse sides, and in that the first positioning projections (20) are arranged on the housing (10) adjacently with respect to the two longitudinal sides and with respect to the two transverse sides of the handle lever (12).

F. The door handle arrangement per any one of A-E, wherein, furthermore, it comprises the vehicle body outer part (26).

G. The door handle arrangement per F, wherein, in the rest position, the handle lever (12) terminates substantially flush with that outer surface of the vehicle body which surrounds the handle cut-out (28).

H. The door handle arrangement per any one of A-G, wherein, furthermore, it comprises a vehicle body inner part (18) which can be fastened to the vehicle body outer part (26), it being possible for the housing (10) to be fastened to the vehicle body inner part (18), and the vehicle body inner part (18) having a cut-out (24), through which the housing (10) protrudes with the handle lever (12) in the state, in which it is fastened to the vehicle body inner part (18).

I. The door handle arrangement per H, wherein second positioning projections (22) are provided on the housing (10), which second positioning projections (22) pre-position the housing (10) in at least one spatial direction in relation to the vehicle body inner part (18) on the cut-out (24) of the vehicle body inner part (18) in the state, in which the said housing (10) is fastened to the vehicle body inner part (18).

J. The door handle arrangement per I, wherein the second positioning projections (22) position the housing (10) in all spatial directions in relation to the vehicle body inner part (18).

K. The door handle arrangement per I or J, wherein the second positioning projections (22) are connected to the housing (10) by way of a latching connection.

L. The door handle arrangement per any one of I-K, wherein the cut-out (24) of the vehicle body inner part (18) has two longitudinal sides and two transverse sides, and in that, in the state in which they are fastened to the vehicle body inner part (18), the second positioning projections (22) bear against the two longitudinal sides and against the two transverse sides of the cut-out (24) of the vehicle body inner part (18).

M. The door handle arrangement per any one of H-I, wherein the housing (10) can be fastened to the vehicle body inner part (18) via a plurality of tolerance compensation elements.

LIST OF DESIGNATIONS

10 Housing
12 Handle lever
14 Fastening elements
16 Fastening seats
18 Vehicle body inner part
20 First positioning projections
22 Second positioning projections
24 Cut-out
26 Vehicle body outer part
28 Handle cut-out
30 Angled-over edge
32 Assembly aid
34 Handle
36 Projections
38 Magnets
40 Fastening screws

What is claimed is:

1. A door handle arrangement for a vehicle, comprising:
a housing and a handle lever which is mounted on the housing such that the handle lever can be moved between a rest position and an actuating position for unlocking and/or opening a vehicle door,
wherein the housing is oriented on a vehicle body outer part which forms a part of the outer surface of a vehicle body and has a handle cut-out for the handle lever,
wherein first positioning projections are mounted on the housing directly adjacent around a periphery of the handle lever when the handle lever is in the rest position, which first positioning projections are configured to bear against a peripheral side of an angled-over edge of the vehicle body outer part, which angled-over edge delimits the handle cut-out of the vehicle body outer part at least in regions, and, as a result, to position the handle lever with the housing in at least one spatial direction in relation to the handle cut-out, wherein the peripheral side faces away from the handle cut-out.

2. The door handle arrangement as claimed in claim 1, wherein the first positioning projections are configured to position the handle lever with the housing in all spatial directions in relation to the handle cut-out by way of bearing against the peripheral side of the angled-over edge of the vehicle body outer part.

3. The door handle arrangement as claimed in claim 2, wherein the first positioning projections are connected to the housing by way of a latching connection.

4. The door handle arrangement as claimed in claim 1, wherein the first positioning projections are arranged in each case at a spacing from the periphery of the handle lever, and in that, in order to position the handle lever with the housing, the angled-over edge is received in the space which is formed in each case by way of the spacing.

5. The door handle arrangement as claimed in claim 1, wherein the handle lever has two longitudinal sides and two transverse sides, and in that the first positioning projections are arranged on the housing adjacently with respect to the two longitudinal sides and with respect to the two transverse sides of the handle lever.

6. The door handle arrangement as claimed in claim 1, wherein, in the rest position, the handle lever terminates substantially flush with that outer surface of the vehicle body which surrounds the handle cut-out.

7. The door handle arrangement as claimed in claim 1, further comprising a vehicle body inner part which can be fastened to the vehicle body outer part, it being possible for the housing to be fastened to the vehicle body inner part, and the vehicle body inner part having a cut-out, through which the housing protrudes with the handle lever in the state, in which it is fastened to the vehicle body inner part.

8. A door handle arrangement for a vehicle, comprising:
a housing and a handle lever which is mounted on the housing such that the handle lever can be moved between a rest position and an actuating position for unlocking and/or opening a vehicle door,
wherein the housing is oriented on a vehicle body outer part which forms a part of the outer surface of a vehicle body and has a handle cut-out for the handle lever,
wherein first positioning projections are provided on the housing, which first positioning projections are configured to bear against a peripheral side of an angled-over edge of the vehicle body outer part, which angled-over edge delimits the handle cut-out of the vehicle body outer part at least in regions, and, as a result, to position the handle lever with the housing in at least one spatial direction in relation to the handle cut-out, wherein the peripheral side faces away from the handle cut-out; and a vehicle body inner part fastened to the vehicle body outer part, the housing fastened to the vehicle body inner part, and the vehicle body inner part having a cut-out, through which the housing protrudes with the handle lever in the state, in which the handle lever is fastened to the vehicle body inner part;

wherein second positioning projections are provided on the housing, which second positioning projections pre-position the housing in at least one spatial direction in relation to the vehicle body inner part on the cut-out of the vehicle body inner part in the state, in which the housing is fastened to the vehicle body inner part.

9. The door handle arrangement as claimed in claim 8, wherein the second positioning projections position the housing in all spatial directions in relation to the vehicle body inner part.

10. The door handle arrangement as claimed in claim 9, wherein the second positioning projections are connected to the housing by way of a latching connection.

11. The door handle arrangement as claimed in claim 10, wherein the cut-out of the vehicle body inner part has two longitudinal sides and two transverse sides, and in that, in the state in which they are fastened to the vehicle body inner part, the second positioning projections bear against the two longitudinal sides and against the two transverse sides of the cut-out of the vehicle body inner part.

12. The door handle arrangement as claimed in claim 11, wherein the housing can be fastened to the vehicle body inner part via a plurality of tolerance compensation elements.

\* \* \* \* \*